Patented June 17, 1930

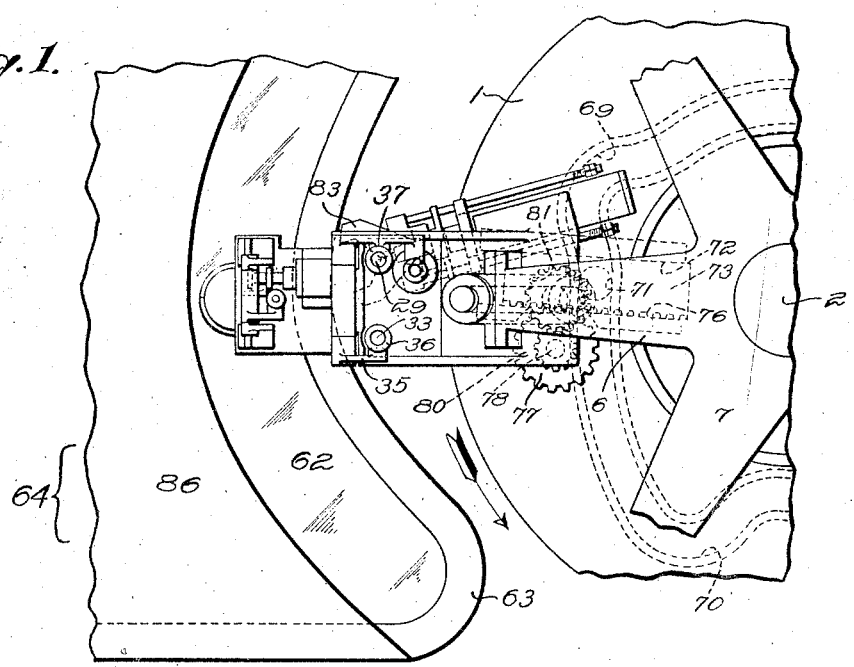

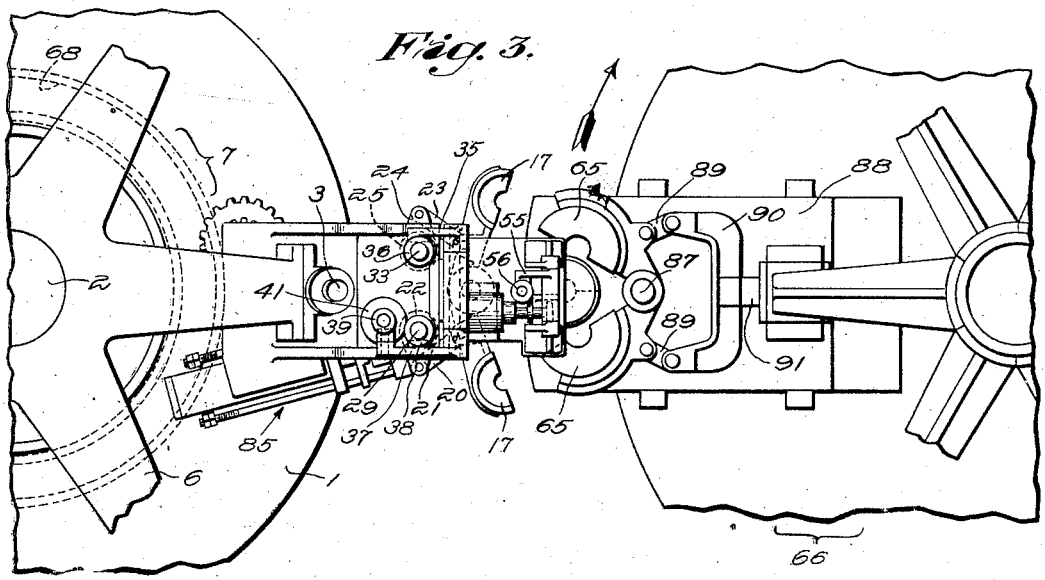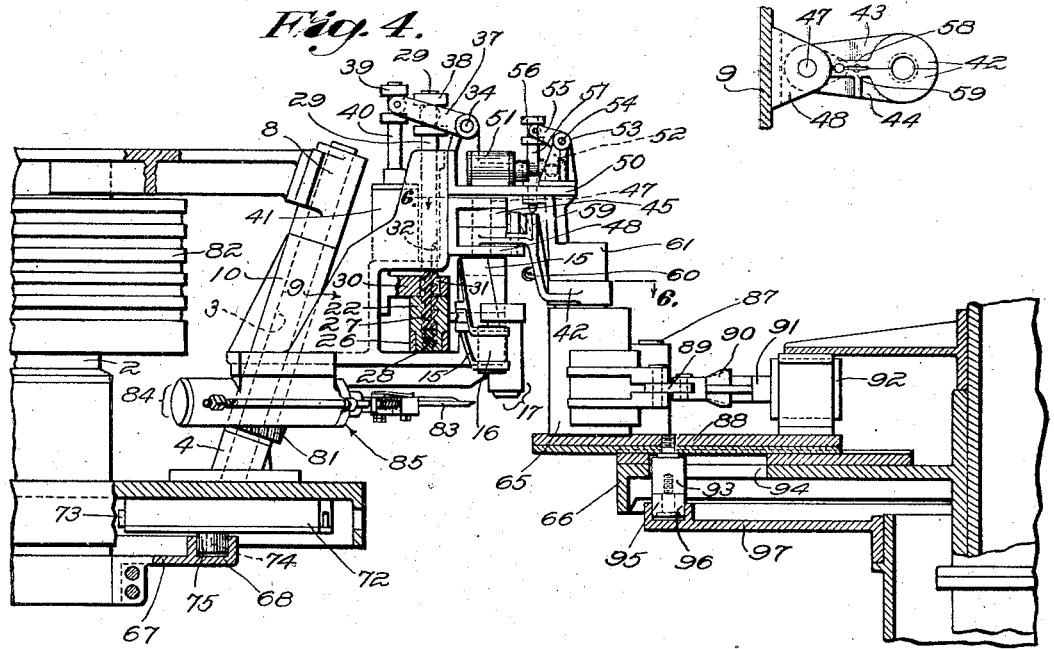

1,764,805

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

SUCTION BOTTLE MACHINE

Application filed February 11, 1929. Serial No. 338,932.

My invention relates generally to the manufacture of glassware and more particularly to glass working machinery of that type which includes a rotary table or carrier on which are supported a plurality of open bottomed parison molds or other glass gathering receptacles, such receptacles being moved by the rotation of the table in a path extending over a glass gathering pool, and provision being made for lowering each receptacle at the proper time into contact with the surface of the glass of the pool to permit glass to be drawn thereinto by suction and for then raising the receptacle with the glass therein for movement away from the gathering pool.

Various expedients have been provided in machines of this type for effecting the lowering of the glass gathering receptacles to the surface of a gathering pool to permit the charging of such receptacles by suction and for subsequently raising the charged receptacles to permit movement thereof from above the gathering pool.

One plan contemplates lowering and raising of the rotary carrier and the glass gathering receptacles thereon as a unit as each gathering receptacle moves to a position over the gathering pool.

Another rotary machine of the type above mentioned makes provision for independently swinging each glass gathering receptacle about a horizontal axis as the rotary table moves about a vertical axis to cause the respective glass gathering receptacles to dip into the gathering pool and to be raised therefrom at the proper times.

Still another form of rotary machine includes means for supporting the respective glass gathering receptacles for independent vertical movement as the rotary table or carrier turns about a vertical axis, so that each gathering receptacle may be lowered to the surface of the gathering pool and raised therefrom at the proper times.

The plans just described for raising and lowering the gathering receptacles all involve rather complicated supporting, operating and timing mechanisms, and in some instances, require a relatively extensive space for the accommodation of the rotary machine and the parts which are carried thereby.

An object of the present invention is to simplify and improve the mechanism that is required to bring glass gathering receptacles of a rotary machine into contact with the surface of an adjacent glass gathering pool at the proper times and to move such receptacles when filled with glass away from the gathering pool for the transfer of the gathered glass to suitable devices for completing the manufacture of articles of glassware.

A still further object of the invention is to provide, in a rotary machine of the character described, improved glass gathering mechanism having an open-bottomed gathering mold supported and operated in such manner as to have its axis vertical while glass is being drawn thereinto by suction from a gathering pool and so that the gathered glass will be supported in a vertical position as the rotation of the table brings such glass to position to be transferred to a blow mold or other glassware forming mechanism.

A still further object of the invention is the provision, in glass working machinery having a rotary table, of a plurality of individual gathering units, each having a glass gathering receptacle, and improved means for mounting such units on the rotary table and for controlling the operations thereof, whereby each glass gathering receptacle will be moved outwardly from the axis of rotation of the table as it is moved above and lowered to the surface of the glass gathering pool, and such receptacle then removed inwardly toward the axis of rotation of the table as it is raised from and moved away from the glass gathering pool, thus permitting glass gathering operations from a pool having but relatively little of its surface exposed to the atmosphere and also permitting the operation of the rotary table and of the glass gathering units thereon in relatively close proximity to the gathering pool.

Other objects and advantages of the invention will be apparent from the hereinafter given detailed description of a practical embodiment of the invention that is illustrated in the accompanying drawings.

According to the present invention, a rotary table adjacent to a gathering pool may be provided with a plurality of upwardly and outwardly inclined supporting pivot elements which are mounted on the table in spaced relation adjacent to the periphery of the latter. A glass gathering unit having an open-bottomed gathering receptacle is mounted on each inclined pivot for oscillation about the axis of the latter. Mechanism is provided for swinging each gathering unit about the inclined axis of its supporting pivot as the rotation of the table brings such unit toward the associated glass gathering pool and such swinging movement of the glass gathering unit about its inclined axis will move its glass gathering receptacle, which may be a parison mold, outwardly from the axis of rotation of the table and downwardly in an inclined plane to position to contact with the surface of the glass gathering pool at a glass gathering station. After the glass gathering receptacle has been filled with molten glass by suction, the mechanism for swinging it about the axis of its inclined supporting pivot acts to raise it to clear the adjacent wall of the receptacle for the glass gathering pool and to swing the glass gathering receptacle toward the axis of rotation of the table. Each glass gathering unit preferably is mounted on its inclined supporting pivot and the swinging movements of the receptacle about such inclined pivot are controlled so that the axis of the glass gathering receptacle will be vertical at the time the receptacle is in contact with the surface of the glass gathering pool, and the axis of the receptacle and of the glass therein will be maintained vertical during the formation of such glass into a parison or blank and while the parison or blank is being transferred to a blow or press mold on an associated finishing mold table. This is of advantage as tending to obviate irregular chilling and forming effects in different portions of the gathered glass and of the parison that is being formed into an article of glassware.

Referring now to the drawings:

Figure 1 is a fragmentary plan view of a portion of a rotary table or carrier and of associated mechanism and structure, showing one glass gathering unit projected outwardly from the axis of rotation of the carrier and lowered into contact with the surface of the glass of an adjacent gathering pool;

Fig. 2 is a sectional elevation of the structure shown in Fig. 1;

Fig. 3 is a fragmentary plan view of the portion of the rotary table of Fig. 1 in a different position and of associated mechanism, showing the glass gathering unit in its outwardly projected position at a station for the transfer of a glass parison therefrom to a finishing mold on an associated rotary finishing mold table;

Fig. 4 is a sectional elevation of the structure shown in Fig. 3;

Fig. 5 is a somewhat reduced diagrammatic view of a cam suitable for causing a desirable cycle of movement of the glass gathering unit during a complete rotation of the rotary table on which such unit is carried; and Fig. 6 is a fragmentary plan sectional view substantially along the line 6—6 of Fig. 4.

In the drawings, a rotary table 1 is mounted for rotation about the axis of a vertical column or post 2. This rotary table or carrier 1 carries, adjacent to its outer periphery, a plurality of spaced upwardly and outwardly inclined pivot elements 3, the lower ends of which may be supported in outwardly and upwardly inclined socket members 4. The latter may be secured on or joined to the rotary carrier in any suitable known manner. Each of the inclined pivot elements 3 supports a swingable glass gathering unit 5. Such pivot elements are stayed and secured firmly in position on the rotary carrier. To this end, the upper end portion of each pivot element 3 may be stayed to the central column or post 2, as by means of an arm 6 of a spider 7 that is mounted on the column 2 for rotation about the axis of the latter with the table 1, each of the spider arms 6 having a collar 8 at its outer end embracing the upper end portion of a pivot element 3.

Each of the glass gathering units 5 may comprise a frame 9 having a hub portion 10 mounted on one of the pivot elements 3 for swinging movement about the axis of the latter. The frame 9 may carry an upwardly extending pivot element 11, Fig. 2, on which are revolubly mounted three superposed hub members 12, 13 and 14, respectively. Arms 15 extend from the upper and lower hub members, 12 and 14, respectively, Fig. 4, and support a holder 16 for a half section of an open bottomed glass gathering mold, generally designated 17. Arms 18 extend from the hub member 13, Fig. 2, and support a holder 19 for the remaining half section of the glass gathering mold 17. The arms 15 are pivotally connected to a link 20 which in turn is pivotally connected to the outer end of a rocker arm 21, Fig. 3, on a rock sleeve 22, Figs. 3 and 4, the construction and operation of which will be hereinafter more fully disclosed. The arms 18 are pivotally connected to a link 23 which in turn is pivotally connected to a rocker arm 24 on a rock sleeve 25, Figs. 2 and 3. As best seen in Fig. 4, the rock sleeve 22 has a reduced lower end portion journaled in a socket bearing 26 on a portion of the frame 9 and has its bore provided with spiral threads 27 in mesh with spiral threads 28 on an axially movable actuating pin 29. The pin 29 extends through a substantially vertical opening in a guide lug 30 on the frame 9 and is held against rotary movement by a spline 31 that engages with a spline-way 32 in the pin. The axial movement of the pin 29 thus will rotate the rock sleeve 22 and will cause swinging movement of the holder 16 and of the half section of the gathering receptacle that is carried thereby, as required for the opening and closing of the gathering receptacle. The rock sleeve 25 of the supporting and operating mechanism for the remaining half section of the glass gathering receptacle is identical in essential respects with the rock sleeve 22 and is shown in Fig. 2 as being supported by a socket bearing 26ª. The sleeve 25 is actuated by an axially movable pin 33 in the same manner as the rock sleeve 22 is actuated by the pin 29. The pin 33 extends slidably through an opening in a lug 30ª, Fig. 2, and has spiral threads for engaging with spiral threads (not shown) on the bore of the rock sleeve 25.

The pins 29 and 33 are moved vertically in unison to rock the sleeves 22 and 25 simultaneously, but in opposite directions by mechanism which may comprise a horizontal rock shaft 34 that is journaled in a bearing on a portion of the frame 9. The rock shaft 34 is provided at one end with a rock lever 35 having engagement at its outer end with a peripherally grooved collar 36 on the upper end of the pin 33. The opposite end of the rock shaft 34 carries a rock lever 37 which is engaged intermediate its length with a peripherally grooved collar 38 on the upper end of the pin 29 and is engaged at its opposite end with a similarly grooved collar 39 on the end of a piston rod 40 which protrudes from the upper end of a pressure fluid cylinder 41. Thus it will be obvious that, as the piston rod is raised to the position shown in Fig. 4, the pins 29 and 33 will be moved upward, thereby causing rotation of the rock sleeves 22 and 25 and opening the sections of the gathering receptacle 17. As the piston rod 40 moves downward to the position shown in Fig. 2, the pins 33 and 29 likewise are moved downward, thereby closing the sections of the gathering receptacle.

A neck mold generally indicated at 42 may comprise half sections carried by arms 43 and 44 respectively, which in turn are carried by sleeves 45 and 46 on a vertical pivot element 47, Figs. 2, 4 and 6. This vertical pivot element is carried by a portion of the frame 9, which may be a bracket as indicated at 48. Another portion of the frame 9, which also may be a bracket 50, carries a horizontal cylinder 51 having a piston rod connected to one arm 52 of a bell crank lever 53 that is fulcrumed on a horizontal pivot element 54. The other arm, 55, of the bell crank lever is engaged with a grooved collar 56 on the upper end of a vertically movable wedge pin 57. The tapered lower end of the wedge pin 57 is adapted, as the wedge pin moves downward, to move between adjacent upstanding lugs 58 and 59, respectively, on the arms 43 and 44 to effect opening of the halves of the neck mold. A spring 60 connects these arms to effect closing of the halves of the neck mold when the wedge pin has been moved upward.

The frame 9 of each glass gathering unit carries a suction head 61 located in position to be disposed directly above and in substantially air tight contact with the neck mold 42 when the sections of the latter are closed, as shown in Fig. 2. This suction head 61 may be provided with suitable means (not shown) for cooperating with the neck mold to form a portion of the gathered glass into the neck portion or finish of a hollow article of glassware. The suction head also may be adapted to permit pressure fluid to be introduced therethrough into the gathered glass to aid in the formation of a parison when the apparatus is to be used in the manufacture of blown glassware.

The improved apparatus includes mechanism for effecting controlled oscillatory movement of each gathering unit about the axis of its inclined pivotal support so as to move the glass gathering receptacle of each unit outwardly and downwardly into contact with the surface of a glass gathering pool 62 to permit a charge of glass to be drawn thereinto at the proper time in each cycle of rotation of the table 1, as shown in Figs. 1 and 2, to move the charged gathering receptacle of each unit inwardly with respect to the axis of rotation of the table 1 and upwardly to clear the glass confining wall 63 of the container 64 in which the gathering pool 62 is disposed, and to subsequently move the gathering receptacle with the gathered glass therein outwardly and downwardly so as to bring the glass blank or parison at the proper time in the cycle of rotation of the table 1, to a station for the transfer of such blank or parison to a finishing mold 65 on an adjacent rotary finishing mold table 66, as shown in Figs. 3 and 4. Such mechanism may comprise a stationary cam plate 67, Figs. 2, 4 and 5, surrounding the column 2 and formed to provide a closed cam groove or track, Figs. 1–3 and 5. This cam groove or track is laid out to comprise a relatively long arcuate portion 68 concentric with the column 2, adjacent outwardly extending angular portions 69 and 70, respectively, and a relatively short dwell portion 71 which connects the adjacent arms of the portions 69 and 70 to each other. The relatively short dwell portions 71 of the cam groove or track may be located at the same radial distance from the axis of the column 2 as the arcuate portion 68. The rotary table 1 is provided adjacent to each gathering unit with a radially disposed guideway 72, which may comprise a pair of guiding and supporting rails secured to the under side of the table. A slide plate 73 is mounted for radial movement in the guideway 72 and carries a depending stud 74 on which is mounted a cam roller 75 adapted to travel in the aforesaid cam groove or track, Figs. 2 and 4. The slide plate 72 is formed with rack teeth 76 in mesh with a pinion 77 on the lower end of a short vertical shaft 78 which depends through an opening in the table 1 adjacent to the guideway 72. The shaft is journalled in a bearing 79 and is retained against axial movement in any suitable known manner. The upper end portion of the shaft 78 carries a helically grooved pinion 80 in mesh with a helically grooved gear 81 on the hub portion of the frame of the gathering unit.

The operation of the structure that has been described so far will be substantially as follows:

The table 1 may be rotated continuously, (or intermittently, if desired) in the direction indicated by the arrow in Fig. 1, in any suitable known manner. A cycle of rotation of the table 1, beginning with the illustrated gathering unit at the position shown in Fig. 3, will cause the the cam roller 75 to travel along the portion 68 of the cam groove or track into the portion 69 of such cam groove. As the roller 75 moves outwardly toward the apex of the portion 69 of the cam groove, the rack bar slide plate 73 will be moved outwardly in the guideway 72, thereby rotating the pinion 77, shaft 78, and pinion 80, and causing swinging of the frame 9 of the associated gathering unit to swing about the axis of its inclined pivotal support in such manner as to move the gathering unit bodily inwardly toward the axis of rotation of the table and upwardly to clear the adjacent portion of the confining wall of the container 64 in which the glass gathering pool is disposed. The receptacle will be moved across the adjacent portion of the container wall 63 as the cam roller travels to the outer part of the portion 69 of the cam groove and the inward movement of the slide plate 73 as the cam roller travels along the other arm of the portion 69 of the cam groove into the portion 71 of the cam groove will cause the gathering receptacle to swing outwardly with respect to the axis of the column 2 and downwardly in an inclined plane toward the surface of the gathering pool so that the open lower end of the gathering receptacle will contact with the surface of the gathering pool at the time the cam roller reaches the portion 71 of the cam groove. It, of course, will be understood that the pneumatically operated mechanism hereinbefore described for opening and closing the parts of the gathering receptacle 17 will have been actuated before such receptacle reaches the gathering station at the surface of the pool 62 to close the gathering receptacle. The neck mold also will be closed. Suction will be applied through the suction head 61, the neck mold 42, and the gathering receptacle 17 to draw glass up into the gathering receptacle and the neck mold when the gathering unit is in the position shown in Figs. 1 and 2. The axial line of the receptacle 17 and neck mold 42 is vertical at this time. The introduction and exhaust of pressure fluid to and from the opposite ends of the pressure fluid cylinders 41 and 51 and the application of negative and positive pressures to the head 61, as required for glass gathering and subsequent forming operations, and the operation of any other pneumatically operated mechanism on the table 1 may be under control of suitable valves (not shown) which in turn may be actuated at the proper times by mechanism (not shown) governed by stationary cam structure 82 on the column 2.

After the filling of the gathering receptacle with glass by suction, in the manner just described, the movement of the cam roller 75 from the portion 71 of the cam groove into the adjacent arm of the portion 70 of the cam groove will cause the charge gathering receptacle to be moved upwardly in an inclined plane from the surface of the pool and also inwardly toward the axis of rotation of the table 1, as well as angularly about the axis of rotation of the table 1. The charged receptacle will clear the adjacent portion of the wall 63 at the time the cam roller 75 reaches the outer part of the portion 70 of the cam groove. Prior to or at this time, the gathered glass may be severed from the glass of the pool by suitable severing means, which may comprise a pair of pivoted shear blades 83, supported by pneumatically operated mechanism, generally indicated at 84, of a well known type, which need not be described in detail but which may include a cylinder 85 carried by the frame 9 of the glass gathering unit. In lieu of such severing mechanism, a shearing blade (not shown) for severing the gathered glass from the glass of the pool, as the glass gathering receptacle moves away from the gathering station, may be employed or any other severing means known in the art may be used.

The gathered glass in the receptacle 17 and neck mold 42 may be formed in any suitable known manner into a parison during the travel of the glass gathering unit from the position shown in Figs. 1 and 2 toward the position shown in Figs. 3 and 4, the cam roller 75 meanwhile moving from the portion 71 of the cam groove along the portion 70 of the cam groove and thence into and along the arcuate portion 68 of the cam groove so that the gathering receptacle will be disposed in its outwardly projected position with its axis vertical at the time it reaches the transfer station of Figs. 3 and 4. While no bottom plate is shown in the drawings for closing the lower end of the gathering receptacle during the formation of such parison, it is to be understood that such bottom plate may be used in a manner that is well known in the art, if the use thereof is required or desirable.

The container 64 which holds the glass of the pool 62 may be a rotary gathering pot, an extension or forehearth appurtenant to a melting tank, or any other suitable container. The cover 86 of such container is cut away adjacent to the outer end of the container to permit movement of the gathering receptacle to and from contact with the surface of the pool at the gathering station. The outer edge of the cut away portion of the top 86 of the container and the outer confining wall of the container 64 may both be curved arcuately as shown so that relatively little of the surface of the glass gathering pool will be exposed to the atmosphere, the radial outward and inward movements of the glass and gathering receptacle as it moves to and from contact with the surface of the gathering pool permitting the gathering of glass from the pool with a minimum of exposure of surface of the gathering pool.

The opening and closing mechanism for the receptacle 17 will be actuated to swing the halves of such receptacle apart at the time the gathering unit reaches the position shown in Figs. 3 and 4, so that the gathered glass or parison will be suspended from the neck mold. As has been hereinbefore pointed out, the construction and arrangement of the parts of the gathering unit are such that the gathering receptacle will be vertical both at the gathering station and when the gathering unit is in its outwardly projected position at the transfer station, as shown in Fig. 3, so that the pendent gathered glass or parison also will be vertical.

The finishing mold 65 may comprise the cooperative half sections which are pivoted at 87 on a radially movable slide plate 88 on the finishing mold table 66. The halves of the finishing mold 65 may be connected by links 89 with a cross head 90 which in turn is operatively connected with a piston rod 91 that protrudes from a radially disposed horizontal cylinder 92. The slide plate 88 is guided for radial movement on the table 66 by suitable guiding elements, as shown. A depending stud 93 projects downwardly from such slide plate through a radial slot 94 in the table 66 and carries a cam roller 95. The latter travels in a cam groove or track 96 on a stationary cam plate or web 97 and controls the radial movements of the slide plate 88 and therefore of the parts which are supported thereon. The arrangement preferably is such that the open finishing mold 65 is moved radially as required to travel with the pendant parison during the closing of the halves of the finishing mold about the parison. The closing of the halves of the finishing mold about the parison of course is effected by the operation of the pneumatic operating mechanism 92 and 91 at the proper time and after the finishing mold has closed about the parison, the halves of the neck mold 42 will be opened to release the parison which then will be carried by the finishing mold and will be subjected therein to suitable operations for the formation of an article of glassware. The particular mechanism for supporting and operating the finishing mold so that it will travel with the parison during the transfer of the parison from the neck mold to the finishing mold is not being claimed herein as claims directed thereto have been made in my prior copending application, Serial No. 323,954, filed Dec. 5, 1928. Reference may be had to that application, if desired, for a more complete disclosure of the details of construction and operation of the table 66 and of the parts thereon and of the steps subsequent to the transfer of a parison to the finishing mold for the manufacture of a finished article of glassware.

The structure illustrated in the accompanying drawings and described in the foregoing specification is only one of many possible embodiments of the invention. It should be understood that the invention may be modified, as to structure, combination, and arrangement of the parts to adapt the invention to different uses or different conditions of service without departing from the spirit and scope thereof.

I claim:

1. Glass gathering apparatus comprising a suction gathering receptacle mounted to swing about an inclined axis, and means for swinging said receptacle about said inclined axis to move said receptacle periodically to and from position to gather glass from a gathering pool.

2. The combination with a gathering pool of molten glass, of a suction gathering receptacle mounted to swing about an inclined axis over confining walls for the pool to and from a glass gathering position in contact with the surface of the pool, and means for swinging said receptacle about said inclined axis.

3. The combination with a gathering pool of molten glass, of a suction gathering receptacle mounted to swing about an inclined axis over confining walls for the pool to and from a glass gathering position in contact with the surface of the pool, and means for swinging said receptacle about said inclined axis, the mounting for said receptacle being adapted to support said receptacle with the axis thereof vertical when the receptacle is at said glass gathering position.

4. In glass working machinery, a rotary carrier, and a glass receptacle carried thereby and mounted to swing about an axis inclined with respect to the axis of rotation of the carrier.

5. In glass working machinery, a carrier mounted to rotate about a vertical axis, and a glass receptacle carried thereby and mounted to swing about an axis inclined from the vertical.

6. In glass working machinery, a rotary carrier, a glass receptacle carried thereby and mounted to swing about an axis inclined from the vertical, and means for periodically oscillating said receptacle about said inclined axis.

7. In glass working machinery, a rotary carrier, an upwardly and outwardly inclined pivot element on said carrier, and a glass gathering receptacle mounted to swing about the axis of said inclined pivot element and also for movement with said rotary carrier.

8. In glass working machinery, a carrier mounted to rotate about a vertical axis, an outwardly and upwardly inclined pivot element on the carrier, an open bottomed glass gatering receptacle mounted to swing about the axis of said inclined pivot element, and cam actuated means for oscillating said receptacle about the axis of said inclined pivot element to move said receptacle downwardly and outwardly during the rotation of the carrier into contact with the surface of an adjacent gathering pool of molten glass and then inwardly with respect to the axis of rotation of the carrier and upwardly with respect to the surface of the pool during the continued rotation of the carrier.

9. Glass gathering mechanism comprising a carrier mounted to rotate about a vertical axis, a suction gathering receptacle mounted on said carrier to swing about an outwardly and upwardly inclined axis, and means responsive to rotation of the carrier to swing said suction gathering receptacle downwardly and outwardly about said inclined axis to permit glass from a gathering pool to be drawn into said receptacle and then upwardly with respect to the pool and inwardly with respect to the axis of rotation of the carrier.

10. Glass gathering apparatus comprising a carrier mounted to rotate about a vertical axis, an upwardly and outwardly inclined pivot element on said carrier, a glass gathering unit comprising a frame mounted on said pivot element to swing about the axis of the latter, a glass gathering receptacle carried by said frame in position to be vertical when said receptacle is at the lowest position to which it may be moved by the oscillation of the frame and cam actuated means for oscillating said frame to swing said receptacle to its said vertical position during each rotation of the carrier.

11. In glass working machinery, a carrier adapted to rotate about a vertical axis, an inclined pivot element on said carrier, means mounted to swing about said inclined axis and adapted to gather glass from a gathering pool when in contact with the surface of the latter and to impart a preliminary shape to the gathered glass, and means controlling the swinging movements of said gathering and preliminary shaping means about said inclined axes to move said gathering and shaping means to and from said glass gathering position during part of a cycle of rotation of said carrier and to present the preliminarily shaped gathered glass at a station for the transfer thereof to further shaping means during another part of the cycle of rotation of the carrier.

12. In glass working machinery, a carrier adapted to rotate about a vertical axis, an inclined pivot element on said carrier, means mounted to swing about said inclined axis and adapted to gather glass from a gathering pool when in contact with the surface of the latter and to impart a preliminary shape to the gathered glass, and means controlling the swinging movements of said gathering and preliminary shaping means about said inclined axes to move said gathering and shaping means to and from said glass gathering position during part of a cycle of rotation of said carrier and to present the preliminarily shaped gathered glass at a station for the transfer thereof to further shaping means during another part of the cycle of rotation of the carrier, the axis of the glass receiving portion of said gathering means being vertical at said gathering station and the axis of the preliminarily shaped gathered glass at the transfer station also being vertical.

13. In glass working machinery, a rotary carrier, an inclined pivot element thereon, a frame mounted to swing about the axis of said inclined pivot element and for travel with said carrier, a partible gathering receptacle carried by said frame, means for oscillating said frame and receptacle as a unit about the axis of said inclined pivot element to move said receptacle during each rotation of the carrier successively to and from a glass gathering position in contact with the surface of a gathering pool and to and from a glass transfer station spaced from the pool, and means for opening said receptacle to permit the transfer of the gathered glass at said transfer station and for closing the receptacle after said transfer has been effected to permit a new glass gathering operation at the pool.

14. In glass working machinery, a carrier mounted to rotate about a vertical axis, an outwardly and upwardly inclined pivot element on said carrier, a frame mounted to oscillate about the axis of said inclined pivot element and for travel with said carrier, a gathering receptacle comprising a pair of partible sections pivotally supported on said frame, a neck mold comprising a pair of partible sections also pivotally supported on the frame and adapted to cooperate with said receptacle, a head carried by said frame in position to introduce pressure through the neck mold into the gathering receptacle when the sections of said neck mold and of the gathering receptacle are closed, means for oscillating said frame about the axis of said inclined pivot element to bring the lower end of the gathering receptacle into contact with the surface of a gathering pool of molten glass at one point in the rotation of the carrier and to bring the gathering receptacle to a transfer station at another point in the rotation of the carrier, and means for controlling the opening and closing of said gathering receptacle and of the neck mold.

15. In glass working machinery, a carrier mounted to rotate about a vertical axis, an inclined pivot element on the carrier, a glass gathering receptacle mounted to oscillate about the axis of said inclined pivot element and for travel with the carrier, a stationary cam adjacent to said carrier, and motion transmitting means actuated by said cam for oscillating said glass gathering receptacle about the axis of said inclined pivot element to move said gathering receptacle to and from a glass gathering position at the surface of a pool of molten glass during each rotation of the carrier.

16. In glass working machinery, a carrier mounted to rotate about a vertical axis, an inclined pivot element on said carrier, glass gathering means mounted to oscillate about the axis of said inclined pivot element and for travel with the carrier, a slide member mounted for movement radially of the carrier, a stationary closed cam extending around the axis of rotation of said carrier, means actuated by said cam on rotation of the carrier for governing radial movements of said slide member, a motion transmitting means connecting said glass gathering means and said slide member for translating radial movements of the slide member into oscillatory movements of the glass gathering means about the axis of said inclined pivot element.

17. In glass working machinery, a carrier mounted to rotate about a vertical axis, an upwardly and outwardly inclined pivot element on said carrier, a frame mounted for oscillatory movement about the axis of said inclined pivot element and for travel with the carrier, a glass gathering receptacle carried by said frame, cam actuated means operable on rotation of the carrier to oscillate said frame about the axis of said inclined pivot element to move said gathering receptable to and from a glass gathering position in contact with the surface of a pool of molten glass during each rotation of the carrier, and severing means carried by the frame for severing the glass in said receptacle from the glass of the pool.

18. In glass working machinery, a carrier mounted for rotation about a vertical axis, an inclined pivot element on said carrier, a receptacle for molten glass mounted for travel with the carrier and for oscillation about the axis of said inclined pivot element, means for supplying molten glass to said receptacle at one point in the cycle of rotation of the carrier, and means for oscillating said receptacle about the axis of said inclined pivot element to bring said receptacle, at another point in the cycle of rotation of the carrier, to a station for the transfer of the glass therein to cooperative glass shaping means.

19. In glass working machinery, a carrier mounted for rotation about a vertical axis, an inclined pivot element on said carrier, a receptacle for molten glass mounted for travel with the carrier and for oscillation about the axis of said inclined pivot element, means for supplying molten glass to said receptacle at one point in the cycle of rotation of the carrier, and means for oscillating said receptacle about the axis of said inclined pivot element to bring said receptacle at another point in the cycle of rotation of the carrier to a station for the transfer of the glass therein to cooperative glass shaping means, said glass receptacle being mounted so that the axis of the glass therein is vertical when said receptacle is at said transfer station.

Signed at Hartford, Connecticut this 29th day of January 1929.

KARL E. PEILER.